(12) United States Patent
Kipfer et al.

(10) Patent No.: US 8,596,217 B2
(45) Date of Patent: Dec. 3, 2013

(54) APPLICATION CONTROLLER

(75) Inventors: Peter Kipfer, Marbach (CH); Christian Betschon, Heiden (CH); Bernd Walser, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 917 days.

(21) Appl. No.: 12/278,919

(22) PCT Filed: Feb. 6, 2007

(86) PCT No.: PCT/EP2007/000994
§ 371 (c)(1),
(2), (4) Date: Aug. 8, 2008

(87) PCT Pub. No.: WO2007/090604
PCT Pub. Date: Aug. 16, 2007

(65) Prior Publication Data
US 2009/0010712 A1 Jan. 8, 2009

(30) Foreign Application Priority Data
Feb. 9, 2006 (EP) .................................... 06101449

(51) Int. Cl.
*B05C 11/00* (2006.01)
*B05B 9/06* (2006.01)
*E01C 23/09* (2006.01)
*A01G 25/09* (2006.01)

(52) U.S. Cl.
USPC ............ 118/712; 118/713; 118/323; 118/679; 404/84.05; 239/172

(58) Field of Classification Search
USPC ......... 118/321, 323, 712, 679, 681, 713, 663, 118/665, 680; 404/84.05, 84.1–84.8; 33/286, 289, DIG. 21; 239/172, 146, 239/150, 73, 100
See application file for complete search history.

(56) References Cited

U.S. PATENT DOCUMENTS

| 5,851,086 | A * | 12/1998 | Kurasako ......................... 404/94 |
| 6,171,018 | B1 * | 1/2001 | Ohtomo et al. ............... 404/84.5 |
| 6,330,503 | B1 * | 12/2001 | Sharp et al. ...................... 701/50 |
| 7,029,199 | B2 * | 4/2006 | Mayfield et al. ........... 404/84.05 |
| 2004/0022417 | A1 * | 2/2004 | Nishigaki et al. ............. 382/104 |

FOREIGN PATENT DOCUMENTS

| CH | 572241 | 1/1976 |
| DE | 4211261 C1 | 7/1993 |
| EP | 0541417 A1 | 5/1993 |
| FR | 2541853 A | 9/1984 |
| FR | 2671412 A | 7/1992 |
| WO | 2006013386 A2 | 2/2006 |

* cited by examiner

*Primary Examiner* — Yewebdar Tadesse
(74) *Attorney, Agent, or Firm* — Maschoff Brennan

(57) ABSTRACT

An application controller for an application unit, for marking substances comprises a radiation sensor, by means of which the relative position of the application unit relative to a reference plane may be determined. The relative position of the application unit can be determined by means for recording the orientation of the application unit controller relative to the reference plane from the association of position with orientation information, such that control instructions, in particular for positional correction may be generated by the application unit controller. The position of the application unit can be adjusted by an actuator device according to the control instructions.

12 Claims, 6 Drawing Sheets

APPLICATION CONTROLLER

Figure 1A:
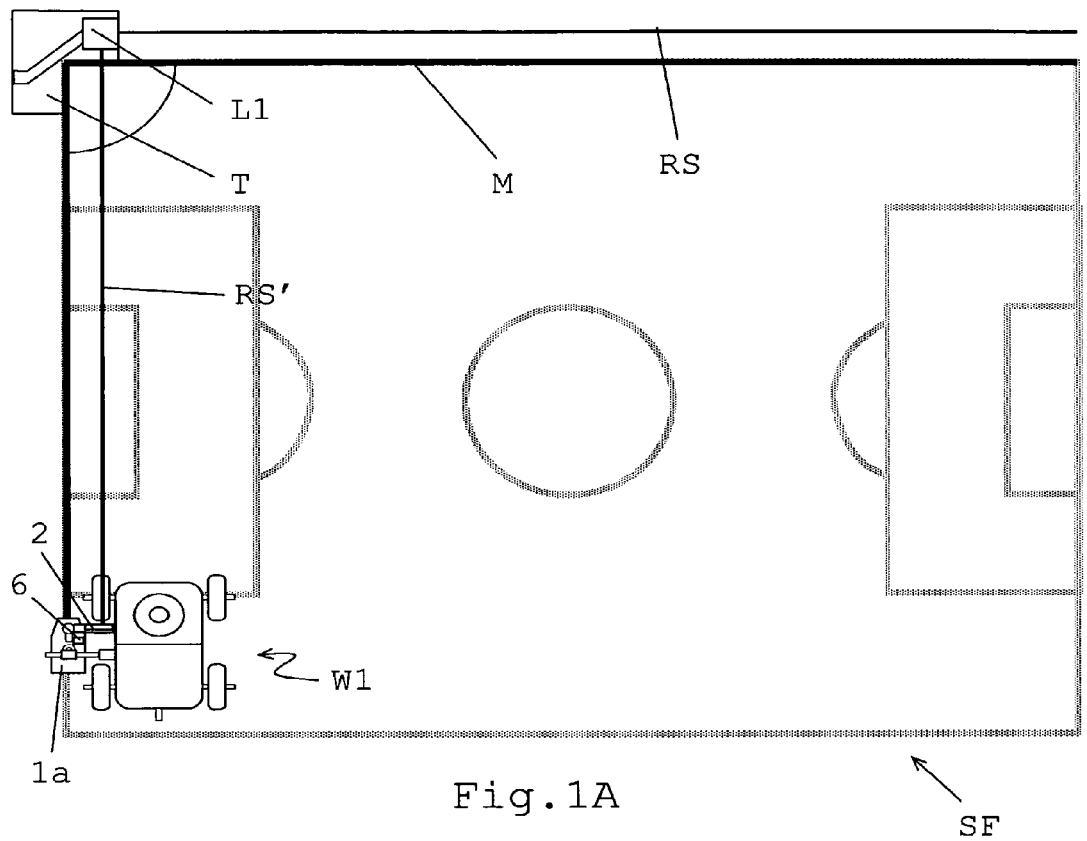

The invention relates to an application control unit for an application unit for marking substance according to claim 1 and a marking trolley according to claim 9.

Marking devices are used for producing ground markings, as are used, for example, for establishing playing fields and sports fields. The marking devices have an outlet for marking substance and are generally formed so as to be mobile in the form of marking trolleys. Before the beginning of the actual marking activity, the field or the lines and/or areas to be marked must be laid out in a defined manner. It is known that this can be achieved, for example, by stringing out the marking region. The region is measured and the lines to be marked are indicated by cords. Thereafter, an operator guides or drives the marking trolley—discharging marking substance—along the cords. However, this method of marking is associated with a multiplicity of possible sources of error, so that deviations from the desired marking position frequently occur. Thus, the accuracy in the—manual—laying of the cords is of course limited. Furthermore, the cord may be displaced during travel. Moreover, the laying out cords are covered with marking substance after marking and may produce undesired marking traces on shifting, picking up or laying out again. In addition, the long time and considerable work involved in such a marking process is disadvantageous.

An improvement in the marking work with regard to accuracy, time requirement and ease of handling is offered by the use of optical guide beams for guiding a marking trolley.

CA 572 241 discloses a system having an arrangement for guiding an object along a straight reference line, which system operates with two static components. Here, a measuring light beam is emitted by a static transmitter and is in turn received by a statically positioned detector. The unit to be moved has a defined edge which is guided in the measuring light beam and permits a relative position determination by obscuration of the detector. On the basis of the obscuration principle, a defined edge must always be kept here in the uninterrupted beam path between static transmitter and detector, which also gives rise to difficulties owing to imaging and scattered light problems. Moreover, this approach requires a setting up of two components aligned precisely relative to one another, which is disadvantageous with regard to the simple and rapid production of ground markings.

A mobile system for marking trolleys is described, for example, in WO 2006/013386. By means of a laser diode and an optical system, a beam having fan-shaped geometry and an elliptical beam cross-section is produced. This beam is emitted for establishing one side of a sports field. The marking carriage used for applying the marking substance has a detector for the laser beam, the position of the marking trolley relative to the vertically oriented beam being indicated. The user of the trolley can guide the latter on the basis of the laser fan as a guide beam.

The application of markings by means of such systems is of generic accuracy on level terrain but does not take into account non uniformities and irregularities of the terrain, such as depressions or obstacles concealed in the grass. Thus, in spite of appropriate detection of the guide beam, it is possible that deviations from the desired marking position may occur.

The object of the invention is to provide an application control unit for a mobile marking device having improved accuracy of marking.

A further object of the invention is the provision of a marking device, in particular trolley, for more accurate marking of sports fields.

A further object is the compensation of inclination-related errors during marking work.

These objects are achieved by the features of claim 1 or 9 and by the features of the dependent claims or the solutions are further developed.

According to the invention, improved accuracy of marking is permitted by an application control unit, which application control unit comprises a radiation sensor for electromagnetic radiation, it being possible by means of the radiation sensor to determine the position of the application unit for marking substance relative to an electromagnetic reference signal or relative to a reference plane established by the signal, and which application control unit furthermore comprises a means for determining the orientation of the application unit relative to the reference plane. The reference signal is received by means of the radiation sensor, and the relative position of application unit and reference signal is determined on the basis of the received signal. By determining the orientation relative to the signal, a further possible source of errors in the marking of lines and/or areas can be determined and—by appropriate measures—can be eliminated. Because the radiation sensor and the means for determining the orientation are in a defined positional relationship relative to the application unit, the relative position of the unit can be derived from the knowledge of the position of the radiation sensor relative to the reference plane and the knowledge of the orientation of the orientation determination means relative to the reference plane. On the basis of the knowledge of this position, the application control unit according to the invention can provide control instructions for the application unit—in particular for position and application correction. A position determined relative to the reference signal can also be represented as a position relative to the reference plane established by the signal.

For a marking device for producing marking lines and/or marking areas, such as a marking trolley for marking sports fields, comprising an application control unit according to the invention, it is thus possible to achieve a very high accuracy of marking in that position and orientation of the application unit relative to the reference plane can be accurately established and, if appropriate, compensated. Establishing the position and orientation of the application unit implies establishment of position and orientation of an outlet for marking substance of the application unit and vice versa. The outlet is connected in a defined manner to the application unit or integrated therein, e.g. as an opening of the unit.

The reference plane or a plurality of reference planes or the reference signal or signals is or are provided by a reference beam generator, in particular a laser transmission unit. The reference beam generator is positioned and oriented in a defined manner before the beginning of the actual marking process, so that the electromagnetic radiation emitted by the generator is available as reference radiation establishing one or more reference plane(s) and intended for guiding the device. In general, the orientation is effected in such a way that the reference plane is vertical relative to the surface to be marked.

A marking device may be any moveable, in particular driveable, device comprising an application unit for marking substance. In particular, the marking device is in the form of a marking trolley which can be pushed or externally controlled by an operator. It is also possible to provide a seat and a control device for a driver. Preferably, the marking device has a support trolley and wheels. By means of a wheel sensor which, for example, determines the revolutions of the wheels per unit time and hence the speed of the journey, a further parameter can be utilised in the control, in particular in automatic control, of the marking device, which optionally serves for further increasing the accuracy of marking.

The marking device has a reservoir for marking substance and a connection and transmission device between reservoir and application unit. Such marking components of the generic type and elements usually used for marking are, however, not described, or not described in detail, below.

The application unit for marking substance is formed with an outlet for marking substance, for example a nozzle, it being possible for outlet and application unit to be indirectly or directly connected. The marking substance is generally transported by means of a pump device and a connecting hose from the reservoir to the outlet and discharged, in particular sprayed, there for marking. The marking substance is preferably liquid but may also be a powder or solid particles which, for example, are atomised by means of the nozzle and adhere to a surface. The outlet may furthermore have a closing device.

The application unit is preferably formed for mounting on the trolley, in particular for detachable mounting. By means of a removable application unit, for example, cleaning thereof is facilitated. Furthermore, the application unit is connected indirectly or directly in an attitude-adjustable manner to the marking device so that position and orientation of the outlet for marking substance can be adjusted relative to the marking device, for example a chassis of the device. This can be achieved, for example, by means of an actuator apparatus which permits a defined displacement of the outlet transversely to the direction of travel—optionally on both sides—of the marking device and a defined adjustment/tilting of the outlet about a longitudinal and transverse axis of the device, for example by means of a joint having two degrees of rotational freedom.

If the radiation sensor for positioning determination and the means for orientation determination of the application control unit are connected directly to the application unit, the arrangement of the application unit on the marking device is chosen in particular according to criteria relating to signal detection which is as reliable and accurate as possible and convenience and compactness of the arrangement. In general, the radiation sensor is arranged offset for receiving the reference signal from the outlet in order to facilitate the guidance of the device around a transmission unit generating the reference signal. If appropriate, the various components and the marking device are formed so that a flexible arrangement on the device is possible—depending on circumstances of the environment to be marked. The sensors/means may also be variable in their position. For example, it is possible to use a control programme which takes into account various input parameters.

The position of the application unit is adjusted via the application control unit, which generally comprises a plurality of components. By appropriate formation, arrangement and interconnection of the components, the possibility of modular upgrading or conversion of the application control unit can be provided. The components—in general a plurality thereof—have a defined positional relationship with the application unit, so that position and orientation determinations carried out by means of the components can be uniquely linked to the position of the application unit.

The radiation sensor is, for example, in the form of a linear or two-dimensional arrangement of photosensitive regions, e.g. in the form of a CCD line or CCD area. A reference or guide beam of a transmission unit, in particular of a laser transmission unit, is detectable on such a sensitive region. The detected beam makes it possible to establish the sensor position relative to the beam and hence also to establish the position of the application unit which is coordinated with the sensor. The guide beam establishes a reference plane for the marking trolley, so that correct marking results on appropriate guidance of the trolley on the reference plane.

The radiation sensor can in principle be in the form of an optical detector, such as a photo detector, arrangement of laser sensors or image recording device, which provides the possibility of receiving the reference signal and deriving the position thereof on the detector.

According to the invention, the application control unit furthermore comprises means for determining the orientation of the application unit relative to the reference plane. A tilt detection means may be a one- or two-axis tilt sensor based on the action of gravitational force—e.g. mounted on the application unit. Two tilt sensors may also be used.

Alternatively, the radiation sensor may be in the form of the means for determining the orientation, for example with a spatial arrangement of sensors for electromagnetic radiation, in particular laser sensors. Position and orientation relative to a received reference signal can be determined with a spatial arrangement of sensors. For such an arrangement, the reference plane may also be oriented, for example, not vertically relative to the ground marking plane but obliquely relative to said plane. It is also possible to work with polarised laser radiation and a polarisation filter coordinated with the sensor arrangement.

In general, a computational unit by means of which the position parameters determined can be further processed and can optionally be output is coordinated with the application control unit. The computational unit can be integrated in the application control unit and arranged, for example, on or in the device. It is also possible for the computational unit to communicate as an external component with the components with the application control unit—for example through a connection via cable or a wireless connection.

If positional deviations of the application unit are found by means of the application control unit, control instructions are sent—indirectly or directly—to the application unit or the application unit is controlled according to the deviation found. Control can be effected in various ways. For example, in the event of a positional deviation, the discharge of the marking substance is stopped, the position is corrected and only thereafter is marking substance discharged again. Alternatively or additionally, the application of the marking substance can be regulated—optionally for correction of deviations—for example by virtue of the fact that discharge parameters, such as direction or speed of the substance discharged, can be controlled. For example, the application control may relate to pressure regulation of a pump device.

Control can also be effected by continuously correcting deviations found—by corresponding control of the application unit—without interrupting the marking work, provided that certain limits are not exceeded. If the deviations are outside a specified tolerance interval, the marking process is stopped. For stopping the marking process, i.e. the emergence of a marking substance, a corresponding stop function can be activated by means of the application control unit—or if appropriate also manually. On activation, the transport of the marking substance to the outlet is stopped; for example, the pump device is switched off and/or the outlet is closed or the connection to the reservoir is interrupted.

After appropriate—automatic or manual—compensation of the deviation, the marking can be continued.

Further embodiments for controlling a marking device or the components of a marking device are to be found, for example, in the British patent application with the application number 0417517.0.

The finding of the deviation can be indicated—by mechanical, optical or acoustic means. Of course, not only can the finding of the deviation be indicated but also the actual position and orientation of the outlet. The detected—and optionally processed—values can be displayed to the operator, for example on a monitor.

Figure 2A:
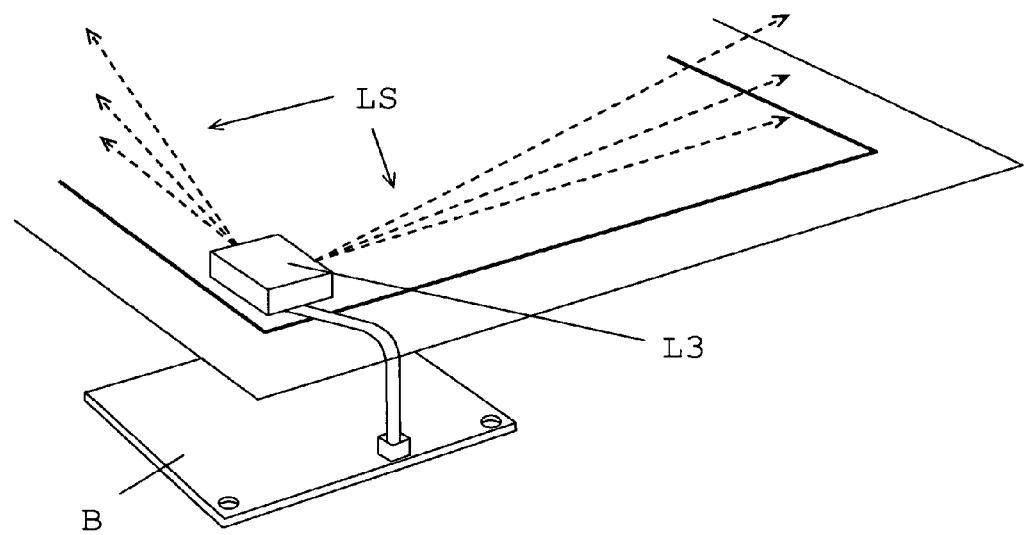
Figure 2B:
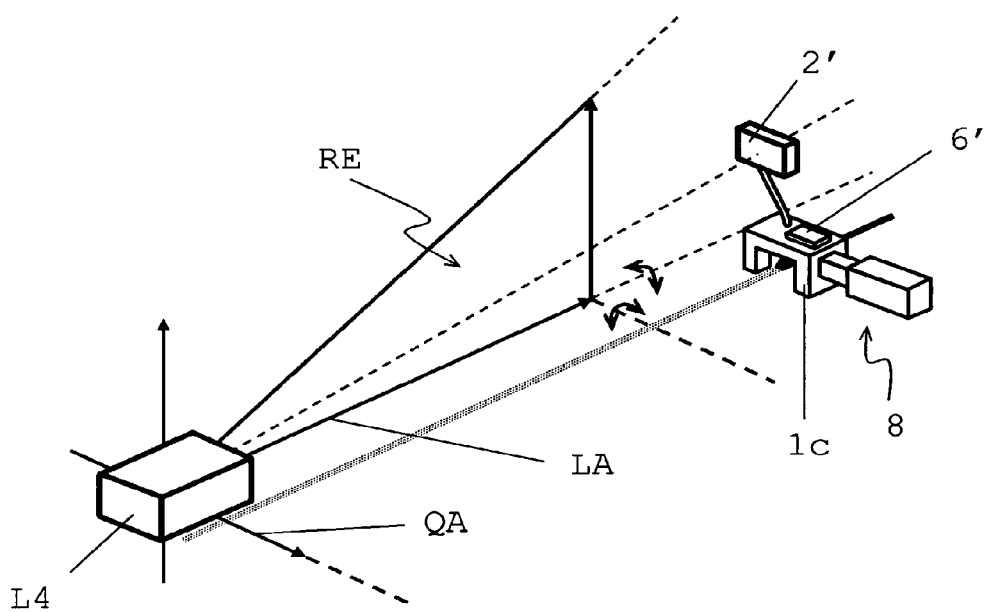
Figure 3A:
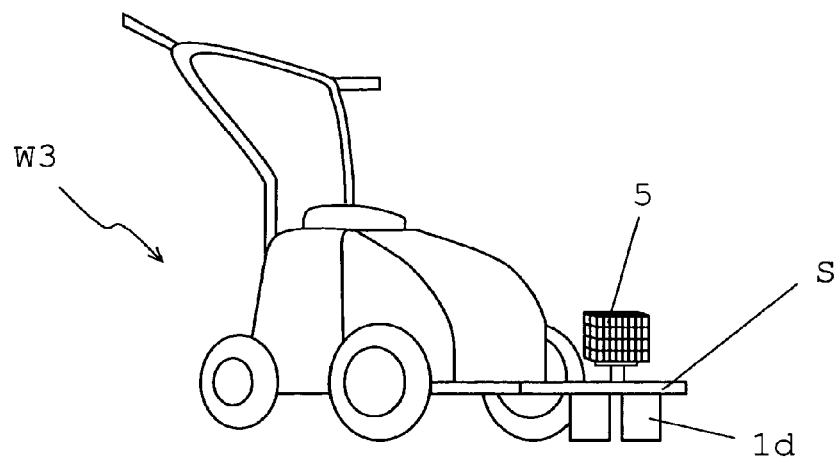
Figure 3B:
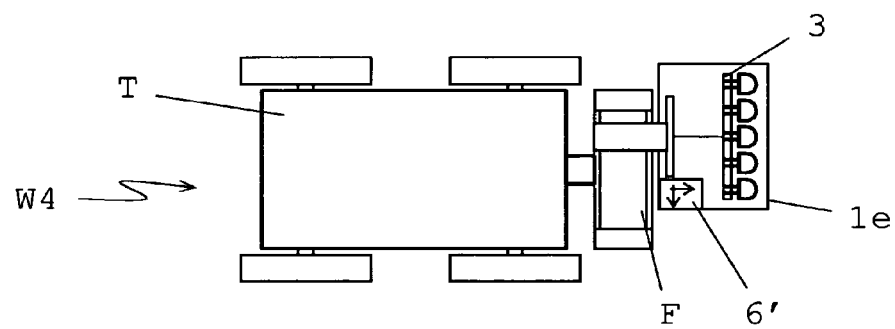
Figure 3C:
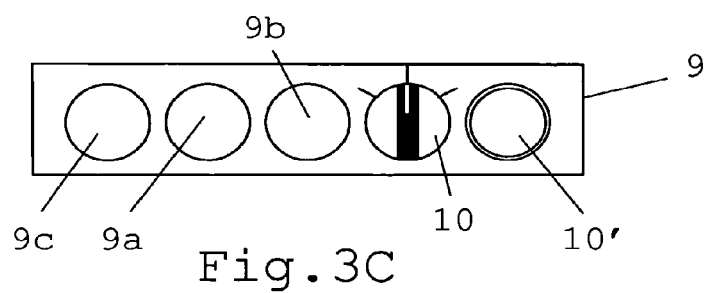
Figure 3D:
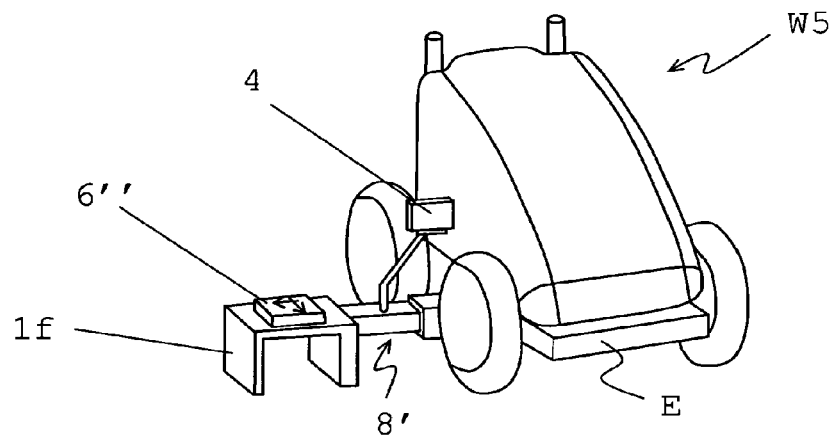
Figure 3E:
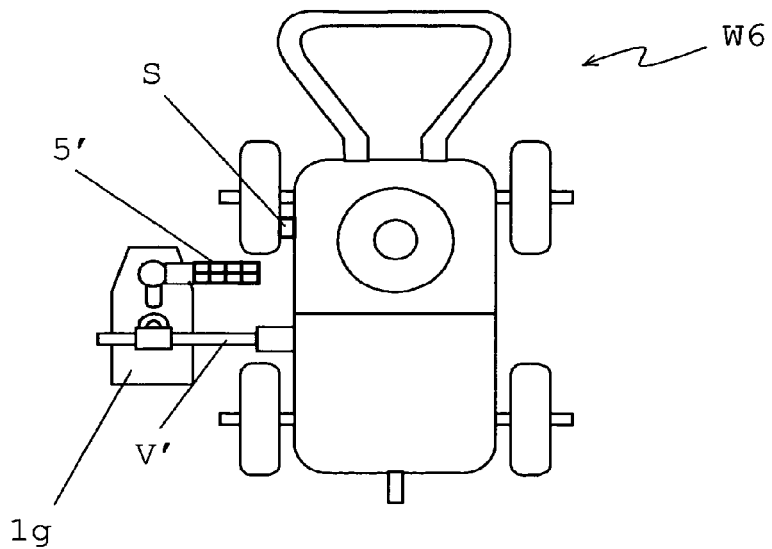
Figure 4A:
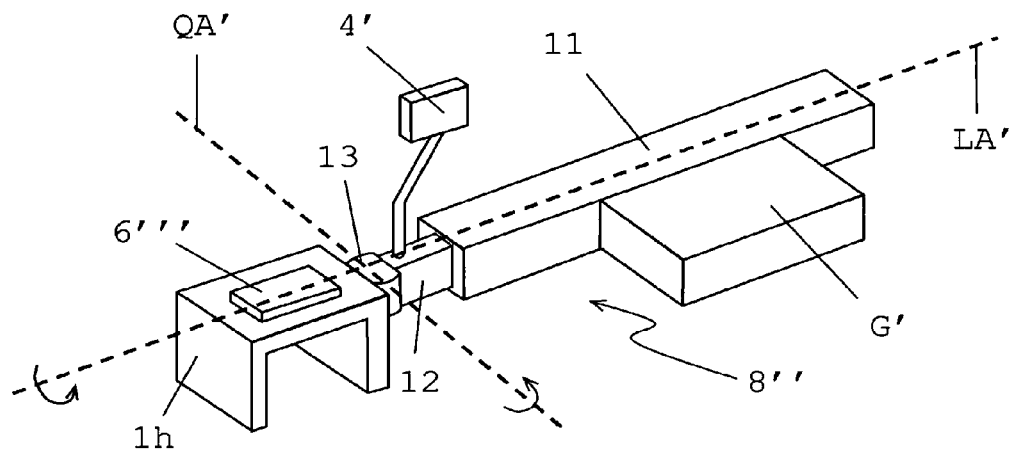
Figure 4B:
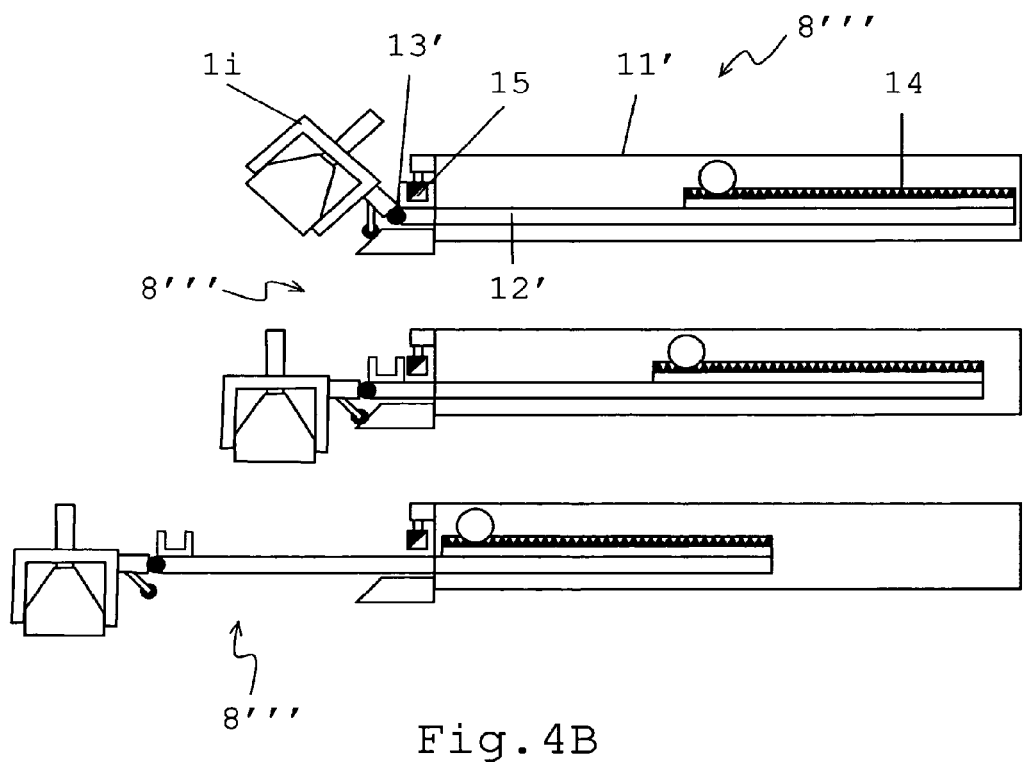
Figure 5:
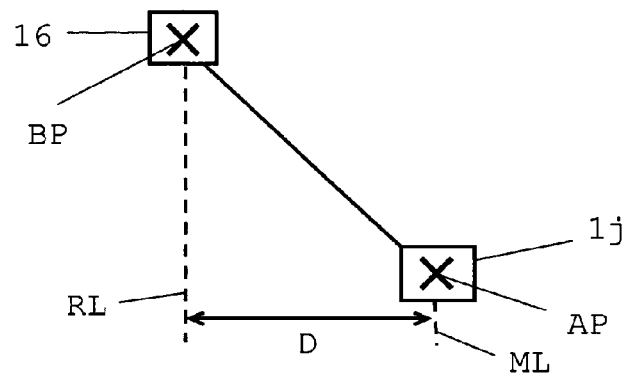

The application control unit according to the invention and marking devices according to the invention are described in more detail below, purely by way of example, with reference to working examples shown schematically in the drawings. Specifically, FIG. 1A shows the diagram of the marking process with a marking trolley according to the invention during the marking of a football pitch, FIG. 1B shows a further diagram of the marking process, FIG. 2A shows a laser transmission unit producing laser beams, FIG. 2B schematically shows a laser transmission unit which defines a reference plane by reference signals and an application control unit according to the invention for determining the position of an application unit relative to the reference plane, FIGS. 3A, 3B show two embodiments of marking devices according to the invention, FIG. 3C shows an indicator apparatus having three indicator lamps and two switches, FIG. 3D, 3E show two further embodiments of marking devices according to the invention, FIG. 4A shows an embodiment of an actuator apparatus comprising optical detector and tilt sensor, FIG. 4B shows a further embodiment of an actuator apparatus, FIG. 5 shows a diagram in broad outline for explaining the operation of the application control unit according to the invention, FIG. 6A-6D show four embodiments of radiation sensors of an application control unit according to the invention.

Figure 1B:
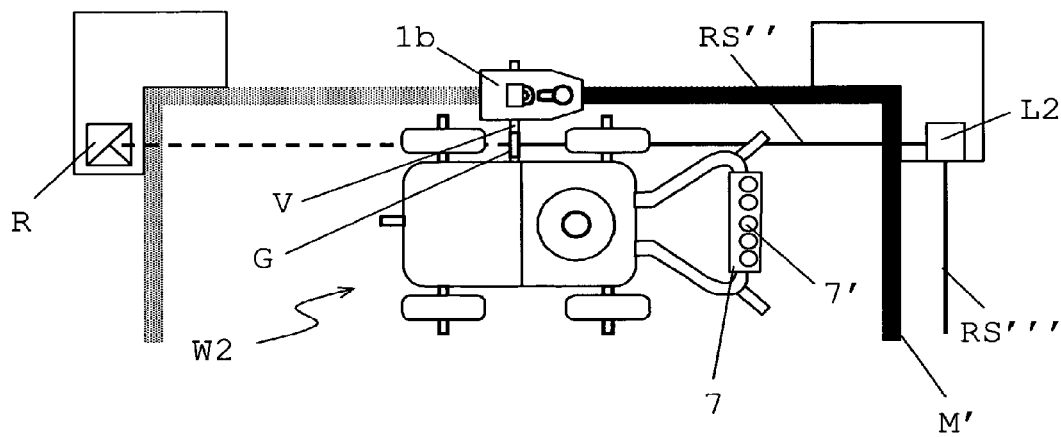

FIG. 1A illustrates a marking process with a mobile marking trolley W1 according to the invention. A sports field SF to be marked—in this case a football pitch—and the marking trolley W1 during the production of ground markings M are shown in plan view. The lines to be marked are indicated, and solid lines represent already marked lines. The marking trolley W1 is actuated here externally, for example by a computational unit communicating with the trolley.

For provision of a reference signal as a "guide signal" for marking trolley W1, a laser transmission unit L1 is fixed by means of a support plate T in a corner of the pitch, which laser transmission unit L1 provides two guide beams diverging in a fan-like manner as electromagnetic reference signals RS, RS'. The laser transmission unit L1 comprises a laser for the emission of laser radiation, a beam expander for producing a radiation fan and a further optical component—for example a pentaprism—for splitting the fan into two part-fans. The transmission unit is positioned and oriented in such a way that the guide beams define two reference planes which are vertical relative to the surface to be marked, the football pitch, the reference planes serving for establishing the marking lines—the field is so to speak optically laid out by means of the transmission unit.

The marking trolley W1 has an application unit 1a for marking substance and a marking substance reservoir which is not shown. The substance is discharged onto the pitch through an outlet of the application unit 1a. According to the invention, the application unit 1a is formed in such a way that its position and hence the position of the outlet can be adjusted in a defined manner. The adjustment is effected according to instructions of an application control unit according to the invention.

This application control unit comprises a radiation sensor 2 for receiving the respective reference signal, so that, from the received signal position of the radiation sensor 2, the relative position thereof can be determined and the position of the marking trolley relative to the corresponding reference plane can be derived therefrom. Here, the application control unit and the radiation sensor 2 can be mounted on the marking trolley W1 and are moved together with this and the application unit 1a so that the sensor area of the radiation sensor 2 is moved so that it always detects the guide beam and feels its way along it. Furthermore, a two-axis tilt sensor 6 for determining two angles of inclination of the application unit is coordinated with the application control unit. Radiation sensor 2 and tilt sensor 6 are firmly connected to the application unit 1a. Thus, the position of the radiation sensor 2 or of the coordinated application unit relative to the reference plane can be determined by linking the sensor signals. On detection of a deviation from the position specified by the reference plane, the application control unit according to the invention provides appropriate control instructions for the application unit 1a. These control instructions can optionally result in the marking trolley being stopped. In particular, however, a positional correction of the application unit 1a is effected via the control instructions. Rapid and very accurate marking of the sports field is thus possible.

FIG. 1B shows a marking vehicle W2, once again during production of ground markings M'. The vehicle is formed for guidance by an operator. Furthermore, an indicator module 7 having a plurality of indicator lamps 7' is arranged on the vehicle. Three indicator lamps 7' are formed for indicating the position of the application unit 1b for marking substance relative to laser radiation emitted by a laser transmitter L2 and two indicator lamps 7' are formed for indicating the orientation of the application unit 1b relative to the laser radiation. The position relative to the laser beams is determined by means of a laser receiver, and values for orientation determination are determined by means of a tilt indicator. Laser receiver and tilt indicator are housed in a common housing G and mounted on a connecting component V between marking vehicle W2 and application unit 1b.

The lines to be marked are specified by means of the laser transmitter L2. This is once again arranged in the corner of a field and defines two reference planes on the basis of the laser radiation split into two reference signals RS'', RS'''. The radiation is emitted at a predefined angle—in this case 90°. Furthermore, a reflector unit R is arranged at that end of the field which is opposite the laser transmitter L2. The reflector unit R can be used for correct orientation of the laser transmitter L2 before the beginning of the marking work. An alternative or additional possible use of reflector units—with appropriate design and arrangement—is the use thereof for optical "laying out" of the entire field. With orientable reflector units, a variety of lines and/or areas can thus be laid out and can be travelled over by a marking device.

The marking vehicle W2 is guided on the basis of the reference signals RS'', RS''' and the optical connection thereof—via the laser receiver—to the vehicle. For marking a line, the marking vehicle W2 must be guided so that the laser receiver can receive the signals. The marking line and the line or plane specified by the signal do not coincide, owing to the offset arrangement of receiver and outlet. On the basis of the outputs of laser receiver and tilt indicator, deviations of the position of the application unit 1b from a position specified by the reference planes are indicated to the operator, which reference planes are fixed on the basis of the reference signals RS', RS'''. The operator can then carry out the corresponding corrections or corrections can of course also be effected via an automatic control.

FIG. 2A shows the diagram of a laser transmission unit L3 for generating reference beams/guide beams LS as reference signals. By means of the laser transmission unit L3, two guide beam bundles—each defining a reference plane—are emitted at a predefined angle—in this case 90°. The laser transmission unit L3 has a base plate B which can be fixed relative to the marking surface. The base plate B itself can be adjustably formed for coarse adjustment with respect to the surface. A laser diode having beam guidance means for emission of the guide radiation is adjustably arranged on the base plate B. The emitted radiation has an asymmetric, in this case elliptical, beam cross-section.

FIG. 2B once again shows the diagram of a transmission unit L4 in the case of the emission of electromagnetic radiation as guide beams. The guide beams define a fan-like reference plane RE. The means for determining the orientation of the application control unit derive the orientation or position of a laser detector 2' as a radiation sensor relative to the reference plane RE. By means of an application control unit according to the invention which has laser detector 2' and tilt sensor 6', the relative position of an application unit 1c for marking substance and the tilt about the longitudinal and transverse axes LA, QA of the plane are thus also determined via the determination of the position of the laser detector 2' relative to the reference plane RE. According to the determined relative position of the application unit 1c, control instructions for adjusting the settings of the application unit 1c are generated by the application control unit, the position being appropriately adjustable by means of an actuator apparatus 8.

FIG. 3A shows a first working example of a marking trolley W3 comprising an application unit 1d arranged at the front of the trolley and intended for marking substance, the arrangement being adjustable with respect to position on a rail S on the trolley. The substance is discharged onto a processing surface through an opening of the application unit 1d. A sensor for electromagnetic radiation of an application control unit according to the invention is firmly connected to the application unit 1d. The sensor used is a spatial arrangement of laser sensors 5, by means of which spatial arrangement of sensors a reference signal can be detected and the position of the application unit 1c relative to the reference plane defined by the reference signal can be determined. Established positional deviations from the reference plane can be compensated by corresponding adjustment of the application unit 1d and hence of the opening. The adjustment comprises the possibilities of displacement transversely to the direction of travel and the tilting of the application unit 1d about a longitudinal and a transverse axis. The adjustments for compensation of positional deviations can be carried out manually by means of mechanical components or automatically by means of electronic components.

FIG. 3B shows, in plan view, a second working example of a marking trolley W4 comprising application unit 1e mounted at the front of the support trolley T. The trolley is equipped with an application control unit according to the invention. Commercially available "base vehicles" can be equipped, for example, with adjustable application unit according to the invention and application control unit according to the invention. A position meter and a tilt meter are coordinated with the application control unit. The position meter is in the form of a linear arrangement of photodiodes 3—diode line—and the tilt meter is in the form of a gravity-controlled two-axis tilt sensor 6'. Position and tilt meters are arranged on the application unit 1e of the trolley. A tilt thereof relative to a specified reference plane about a longitudinal axis (axis in direction of travel) and a transverse axis perpendicular thereto can be determined by means of the tilt sensor 6'. The position meter in turn determines the position of the application unit relative to the reference plane. Deviations from required values for the position and orientation of the application unit 1e determined by the application control unit—which required values are defined by the reference plane—are compensated by appropriately adjusting the application unit 1e in position and orientation. Here, a lateral movement of the unit is permitted via a guide F on the marking trolley W4, and an angular adjustment of the unit can be carried out by means of a joint coupling which is not shown. If a—previously determined—limit for the respective deviation is reached, detection by means of the application control unit and a control command for stopping the marking process are effected. The control command may result—for example with the aid of appropriate electronics—in immediate automatic stopping of the marking, for example by automatic stopping of a pump, or in the transmission of the information to an operator who then takes the further measures.

FIG. 3C shows an indicator apparatus 9 for a marking device according to the invention. Three indicator lamps visualise positions of the application unit for marking substance of the device. If the middle lamp 9a lights up—for example green—the application unit is in the intended position. Lighting up of the right or left lamp 9b, 9c—e.g. yellow—indicates a deviation to the right or left of the intended position. The first switch 10 is intended for settings of the device—for example, functions such as automatic operation, parking position or cleaning position for the device can be selected therewith. With the second switch 10', a pump for transporting the marking substance can be switched on and off. In this embodiment, an indicator apparatus comprising three position indicator lamps is shown. Indicators for indicating the orientation of the application unit can also preferably be provided on an indicator apparatus. This embodiment of the indicator apparatus 9 is purely by way of example.

FIG. 3D shows a third working example of a marking trolley W5 comprising application unit 1f according to the invention, arranged laterally on the trolley and application control unit according to the invention. Application unit 1f and application control unit are formed in such a way that they can be easily connected to the trolley. Thus, these parts can also be provided as modules for commercially available devices. The application control unit has the following components: a CCD area array 4 as an optical detector and a tilt sensor 6'', which are connected to the application unit 1f, an actuator apparatus 8' for setting the position of the application unit 1f, and a housing with electronics E for processing of the detector/sensor outputs and provision of instructions for controlling the position settings of the application unit 1f. The tilt sensor 6'' is arranged directly over the outlet of the application unit 1f. CCD area array 4 and tilt sensor 6'' serve—analogously to above embodiments—for determining the relative position. By means of the electronics position values detected are evaluated with respect to reference values and, if appropriate, compensation values are determined and provided. In the case of deviations of the position values from the reference values, a change of position of the application unit 1f on the basis of the compensation values is effected via the electronics E and the actuator apparatus 8'. If appropriate, stopping—and resumption—of the marking process are also effected.

With the orientation of the marking trolley W5 during the marking of surfaces on a predefined reference plane, the marking process can thus be carried out with high accuracy in an automated manner.

The marking trolley W6 from FIG. 3E, shown as a third working example in FIG. 3E, likewise has a lateral outlet for marking substance. With the three-dimensional CCD 5' arranged as close as possible to the outlet, position and orientation parameters relative to an optical reference plane can be determined. Advantageously, a tilted plane can be provided as a reference plane for such an embodiment of the marking trolley W6. The outlet is adjustable in position via a displaceably and tiltably mounted connecting element V' of the application unit 1g. The marking trolley W6 is furthermore equipped with a wheel sensor S for providing measured values for monitoring and controlling the travelling speed.

FIG. 4A shows the diagram of coupled components of an application control unit according to the invention. An application unit 1h for marking substance is adjustable in position by means of an actuator apparatus 8". The actuator apparatus 8" comprises a square tube 11 and a linear axle 12 mounted in the square tube 11, the linear axle 12 being laterally displaceable by means of a motor. The motor is housed in a housing G' in which a plurality of electronic components are also present. Furthermore, the actuator apparatus 8" comprises an articulated coupling 13 which permits a defined adjustment of the application unit about a longitudinal and transverse axes LA', QA'.

A two-dimensional arrangement of photosensitive regions 4' as a radiation detector—arranged here on the linear axle 12—provides a signal with respect to a relative position of the application unit 1h firmly connected to the linear axle 12. By means of a tilt sensor 6''' mounted on the application unit 1h, a relative orientation of the application unit 1h can be determined. By means of the electronic components of the application control unit, the position and orientation signals detected are processed and corresponding control instructions are output or transmitted. Thus, on determination of deviations of the application unit 1h from a specified position, the actuator apparatus 8" is controlled in such a way that the positional deviations are compensated.

FIG. 4B shows a section through an application unit 1i comprising actuator apparatus 8'''. A longitudinal bearing 14 having a rack drive is present in a square tube 11' of the actuator apparatus 8'''. A linear axle 12' of the actuator apparatus 8''' is displaceable by means of the rack drive. A joint 13' having two degrees of rotational freedom permits adjustment of the orientation of the application unit 1i. Furthermore, the actuator apparatus 8''' has an element 15 here for stopping the application unit 1i in a parking position. In the top view, the application unit 1i is in the parking position by means of the element. In the middle view, the application unit 1i is shown in the active position for marking. The bottom view shows linear axle 12' and application unit 1i in the extended position, which is assumed, for example, for compensating a determined deviation from a specified position.

FIG. 5 shows a diagram in broad outline of geometrical relationships between a detector unit 16, an application unit 1j, a reference line RL and marking line ML, reference being made to the above embodiments for the function of the respective elements. By means of a defined geometrical arrangement, the relative position of detector unit 16 and application unit 1j is known. Here, the detector unit 16 is formed for determining the position and orientation of the application unit 1j. A transmission unit—not shown—indirectly specifies the marking line ML to be marked by means of the application unit 1j by producing reference line RL at a distance DE from the desired marking line ML by radiation emitted by the transmission unit. If the radiation strikes the detector unit 16 substantially perpendicularly at a reference point BP, detector unit 16 and application unit 1j are correctly positioned and oriented and an outlet point AP of the application unit 1j is present exactly—perpendicularly—above the marking line ML. The distance between a projection of the reference point BP and projection of the outlet point AP onto the surface to be marked then corresponds to the distance D. However, the distance between the projected points no longer corresponds to the distance D if the orientation of the detector unit 16—and of the application unit 1j—relative to the reference line RL changes, which implies a disagreement between the projected outlet point AP and the marking line ML—i.e. incorrect marking. For compensating changes in the projection spacing, compensation values, for example for angle compensation, are determined on the basis of the deviations found by means of the detector unit 16. Compensation values are also provided in the case of positional deviations of the reference point BP from the reference line RL—which are evident from the fact that the radiation no longer strikes the reference point BP.

FIGS. 6A to 6D show four working examples of radiation sensors of an application control unit according to the invention, the black areas representing in each case a reference signal mapped on the respective radiation sensor. The respective images provide a signal corresponding to the size or the shape and the intensity of the mapped reference signal.

Figure 6A:
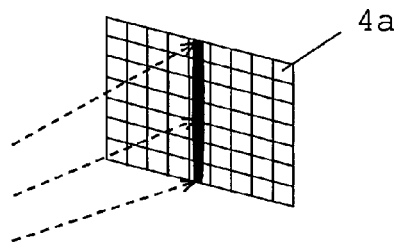

In the first working example from FIG. 6A, the radiation sensor is in the form of CCD area sensor 4a. On the basis of the mapping of a reference signal produced by means of electromagnetic radiation on the CCD area sensor 4a, it is evident that the sensor area is oriented perpendicularly to the central reference signal.

Figure 6B:
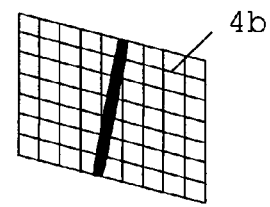

In FIG. 6B on the other hand, in a second working example, the reference signal mapping on the radiation sensor in the form of CCD sensor 4b has migrated from its central position, i.e. the sensor area is tilted relative to the reference signal axis. Such mapping of the signal is obtained, for example, when the sensor or the application control unit—in reference to the above embodiments—is tilted transversely to the direction of travel.

Figure 6C:
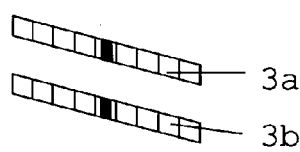

FIG. 6C shows the radiation sensor in a third working example as an arrangement of two CCD line sensors 3a, 3b. The image of the reference symbol indicates a correct relative position of radiation sensor and reference signal.

Figure 6D:
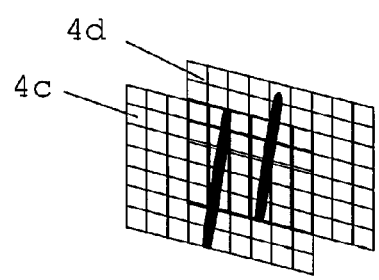

The fourth working example from FIG. 6D represents a radiation detector formed as an arrangement of two matrix-like CCDs 4c, 4d. The two CCDs 4c, 4d are arranged with an intermediate space in two planes. With a spatial arrangement of this type, both a tilt of the CCDs 4c, 4d—and of the application control unit—transversely to the direction of travel as well as in the direction of travel can be detected. The magnitude of the tilt can be determined, for example, on the basis of parameters such as light intensity or eccentricity of the position of the image on the CCDs 4c, 4d. It is also possible to determine the tilt on the basis of a calibration performed beforehand.

The invention claimed is:

1. An application control unit for a mobile application unit for marking substance for producing ground markings, comprising:
   a radiation sensor mountable on the mobile application unit, the radiation sensor being configured for receiving an electromagnetic reference signal expanded in the form of a fan, the radiation sensor being formed so that the position of the mobile application unit relative to a reference plane defined by the reference signal is derived on the basis of the received reference signal, wherein the radiation sensor is a laser detector and has a two-dimensional arrangement of laser sensors; and means for determining the orientation of the mobile application unit relative to the reference plane, wherein the two dimensional arrangement of laser sensors detect the electromagnetic reference signal in the form of a mapped reference signal sensed by the two-dimensional arrangement of laser sensors where the orientation of the mobile application unit as a tilt transversely to the direction of travel is determined from an inclination of the detected mapped reference signal;

the application control unit being configured to provide control instructions for the mobile application unit.

2. An application control unit according to claim 1, wherein the control instructions include position correction.

3. An application control unit according to claim 1, wherein the means for determining the orientation of the mobile application unit relative to the reference plane determines the orientation of the mobile application unit relative to the reference plane by deriving the orientation of the radiation sensor relative to the reference plane.

4. An application control unit according to claim 1, wherein the radiation sensor is in the form of the means for determining the orientation.

5. An application control unit according to claim 4, wherein the radiation sensor has a spatial arrangement of laser sensors.

6. An application control unit according to claim 1, wherein the means for determining the orientation of the mobile application unit relative to the reference plane comprise a gravity-controlled two-axis sensor.

7. An application control unit according to claim 1, further comprising an indicator apparatus for indicating the position of the mobile application unit.

8. An application control unit according to claim 1, further comprising an actuator apparatus for adjusting the position of the mobile application unit according to the control instructions.

9. A marking trolley for producing ground markings, comprising:
a support trolley;
an application unit for marking substance; and
an application control unit according to claim 1.

10. A marking trolley according to claim 9, wherein the application unit is adjustable in position relative to the support trolley.

11. A marking trolley according to claim 10, wherein the application unit is adjustable in position in a defined manner by means of an actuator apparatus.

12. A marking trolley according to claim 9, further comprising a revolution-sensitive wheel sensor.

* * * * *

UNITED STATES PATENT AND TRADEMARK OFFICE
CERTIFICATE OF CORRECTION

PATENT NO. : 8,596,217 B2  
APPLICATION NO. : 12/278919  
DATED : December 3, 2013  
INVENTOR(S) : Kipfer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Twenty-second Day of September, 2015

Michelle K. Lee
*Director of the United States Patent and Trademark Office*